(12) United States Patent
DeBoer et al.

(10) Patent No.: US 7,645,574 B2
(45) Date of Patent: Jan. 12, 2010

(54) METHODS OF METALLIZING NUCLEIC ACID MOLECULES AND METHODS OF ATTACHING NUCLEIC ACID MOLECULES TO CONDUCTIVE SURFACES

(75) Inventors: Charles D. DeBoer, Palmyra, NY (US); Roberta J. Greco, Canandaigua, NY (US); John M. Noonan, Rochester, NY (US); Richard S. Murante, Henrietta, NY (US)

(73) Assignee: Integrated Nano-Technologies, LLC, Henrietta, NY (US)

( * ) Notice: Subject to any disclaimer, the term of this patent is extended or adjusted under 35 U.S.C. 154(b) by 153 days.

(21) Appl. No.: 10/763,597

(22) Filed: Jan. 23, 2004

(65) Prior Publication Data

US 2004/0229247 A1 Nov. 18, 2004

Related U.S. Application Data

(60) Provisional application No. 60/442,341, filed on Jan. 23, 2003.

(51) Int. Cl.
*C12Q 1/68* (2006.01)

(52) U.S. Cl. .......................................................... 435/6
(58) Field of Classification Search ....................... None
See application file for complete search history.

(56) References Cited

U.S. PATENT DOCUMENTS

| 5,945,527 | A  | * | 8/1999  | Tu et al. ..................... 536/27.6 |
| 2003/0060873 | A1 | * | 3/2003  | Gertner et al. ............. 623/1.15 |
| 2004/0132220 | A1 | * | 7/2004  | Fish .......................... 436/525 |
| 2004/0241699 | A1 | * | 12/2004 | Zocchi et al. .................. 435/6 |

OTHER PUBLICATIONS

Richter et al. Nanoscale palladium metallization of DNA. Advanced Materials (2000) 121:507-510.*

\* cited by examiner

*Primary Examiner*—Kenneth R. Horlick
*Assistant Examiner*—David C Thomas
(74) *Attorney, Agent, or Firm*—Thomas R. FitzGerald; Jason R. Womer; Hiscock & Barclay, LLP

(57) ABSTRACT

The present invention relates to methods of metallizing nucleic acid molecules and to methods of attaching nucleic acid molecules to conductive surfaces. Methods of detecting target nucleic acid molecules based on these techniques are also disclosed.

31 Claims, 5 Drawing Sheets

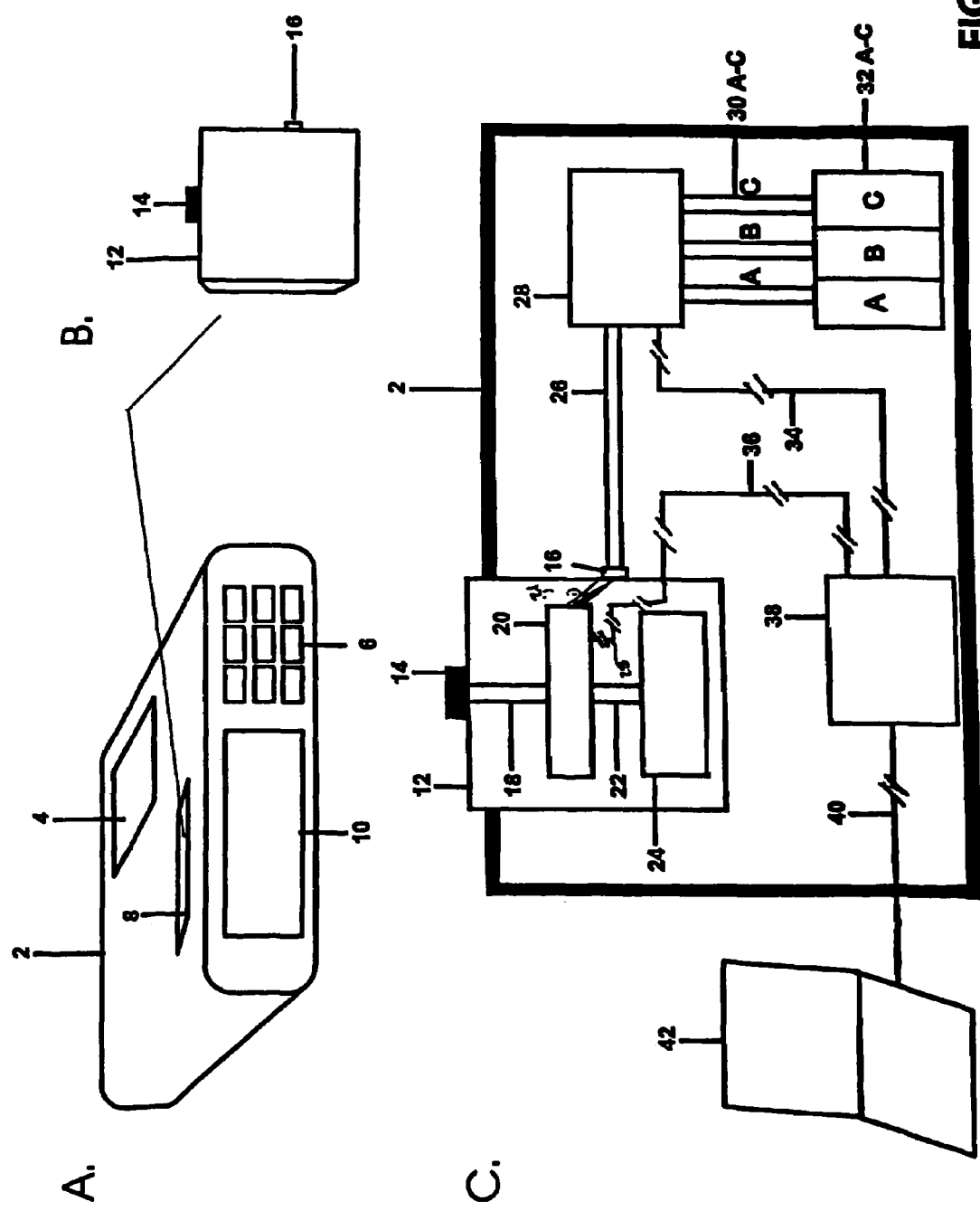

United States Patent US 7,645,574 B2

METHODS OF METALLIZING NUCLEIC ACID MOLECULES AND METHODS OF ATTACHING NUCLEIC ACID MOLECULES TO CONDUCTIVE SURFACES

This application claims the benefit of U.S. Provisional Patent Application Ser. No. 60/442,341, filed Jan. 23, 2003, which is hereby incorporated by reference in its entirety.

FIELD OF THE INVENTION

This invention relates to methods of metallizing nucleic acid molecules, methods of attaching nucleic acid molecules to conductive surfaces, and uses thereof.

BACKGROUND OF THE INVENTION

Nucleic acids, such as DNA or RNA, have become of increasing interest as analytes for clinical or forensic uses. Powerful new molecular biology technologies enable one to detect congenital or infectious diseases. These same technologies can characterize DNA for use in settling factual issues in legal proceedings, such as paternity suits and criminal prosecutions.

For the analysis and testing of nucleic acid molecules, amplification of a small amount of nucleic acid molecules, isolation of the amplified nucleic acid fragments, and other procedures are necessary. The science of amplifying small amounts of DNA have progressed rapidly and several methods now exist. These include linked linear amplification, ligation-based amplification, transcription-based amplification and linear isothermal amplification. Linked linear amplification is described in detail in U.S. Pat. No. 6,027,923 to Wallace et al. Ligation-based amplification includes the ligation amplification reaction (LAR) described in detail in Wu et al., *Genomics* 4:560 (1989) and the ligase chain reaction described in European Patent No. 0320308B1. Transcription-based amplification methods are described in detail in U.S. Pat. Nos. 5,766,849 and 5,654,142, Kwoh et al., *Proc. Natl. Acad. Sci. U.S.A.* 86:1173 (1989), and PCT Publication No. WO 88/10315 to Ginergeras et al. The more recent method of linear isothermal amplification is described in U.S. Pat. No. 6,251,639 to Kurn.

The most common method of amplifying DNA is by the polymerase chain reaction ("PCR"), described in detail by Mullis et al., *Cold Spring Harbor Quant. Biol.* 51:263-273 (1986), European Patent No. 201,184 to Mullis, U.S. Pat. No. 4,582,788 to Mullis et al., European Patent Nos. 50,424, 84,796, 258017, and 237362 to Erlich et al., and U.S. Pat. No. 4,683,194 to Saiki et al. The PCR reaction is based on multiple cycles of hybridization and nucleic acid synthesis and denaturation in which an extremely small number of nucleic acid molecules or fragments can be multiplied by several orders of magnitude to provide detectable amounts of material. One of ordinary skill in the art knows that the effectiveness and reproducibility of PCR amplification is dependent, in part, on the purity and amount of the DNA template. Certain molecules present in biological sources of nucleic acids are known to stop or inhibit PCR amplification (Belec et al., *Muscle and Nerve* 21(8):1064 (1998); Wiedbrauk et al., *Journal of Clinical Microbiology* 33(10):2643-6 (1995); Deneer and Knight, *Clinical Chemistry* 40(1):171-2 (1994)). For example, in whole blood, hemoglobin, lactoferrin, and immunoglobulin G are known to interfere with several DNA polymerases used to perform PCR reactions (Al-Soud and Radstrom, *Journal of Clinical Microbiology* 39(2):485-493 (2001); Al-Soud et al., *Journal of Clinical Microbiology* 38(1):345-50 (2000)). These inhibitory effects can be more or less overcome by the addition of certain protein agents, but these agents must be added in addition to the multiple components already used to perform the PCR. Thus, the removal or inactivation of such inhibitors is an important factor in amplifying DNA from select samples.

On the other hand, isolation and detection of particular nucleic acid molecules in a mixture requires a nucleic acid sequencer and fragment analyzer, in which gel electrophoresis and fluorescence detection are combined. Unfortunately, electrophoresis becomes very labor-intensive as the number of samples or test items increases.

For this reason, a simpler method of analysis using DNA oligonucleotide probes is becoming popular. New technology, called VLSIPS™, has enabled the production of chips smaller than a thumbnail where each chip contains hundreds of thousands or more different molecular probes. These techniques are described in U.S. Pat. No. 5,143,854 to Pirrung et al., PCT Publication No. WO 92/10092, and PCT WO 90/15070. These biological chips have molecular probes arranged in arrays where each probe ensemble is assigned a specific location. These molecular array chips have been produced in which each probe location has a center to center distance measured on the micron scale. Use of these array type chips has the advantage that only a small amount of sample is required, and a diverse number of probe sequences can be used simultaneously. Array chips have been useful in a number of different types of scientific applications, including measuring gene expression levels, identification of single nucleotide polymorphisms, and molecular diagnostics and sequencing as described in U.S. Pat. No. 5,143,854 to Pirrung et al.

Array chips where the probes are nucleic acid molecules have been increasingly useful for detection of the presence of specific DNA sequences. Most technologies related to array chips involve the coupling of a probe of known sequence to a substrate that can either be structural or conductive in nature. Structural types of array chips usually involve providing a platform where probe molecules can be constructed base by base or by covalently binding a completed molecule. Typical array chips involve amplification of the target nucleic acid followed by detection with a fluorescent label to determine whether target nucleic acid molecules hybridize with any of the oligonucleotide probes on the chip. After exposing the array to a sample containing target nucleic acid molecules under selected test conditions, scanning devices can examine each location in the array and quantitate the amount of hybridized material at that location. Alternatively, conductive types of array chips contain probe sequences linked to conductive materials such as metals. Hybridization of a target nucleic acid typically elicits an electrical signal that is carried to the conductive electrode and then analyzed.

For most solid support or array technologies, small oligonucleotide capture probes are immobilized or synthesized on the support. The sequence of the capture probes imparts the specificity for the hybridization reaction. Several different chemical compositions exist currently for capture probe studies. The standard for many years has been straight deoxyribonucleic acids. The advantage of these short single stranded DNA molecules is that the technology has existed for many years and the synthesis reaction is relatively inexpensive. Furthermore, a large body of technical studies is available for quick reference for a variety of scientific techniques, including hybridization. However, many different types of DNA analogs are now being synthesized commercially that have advantages over DNA oligonucleotides for hybridization. Some of these include PNA (protein nucleic acid), LNA (locked nucleic acid) and methyl phosphonate chemistries. In general, all of the DNA analogs have higher melting temperatures than standard DNA oligonucleotides and can more easily distinguish between a fully complementary and single base mis-match target. This is possible because the DNA analogs do not have a negatively charged backbone, as is the case with standard DNA. This allows for the incoming strand of target DNA to bind tighter to the DNA analog because only one strand is negatively charged. The most studied of these analogs for hybridization techniques is the PNA analog, which is composed of a protein backbone with substituted nucleobases for the amino acid side chains (see www.appliedbiosystems.com or www.eurogentec.com). Indeed, PNAs have been used in place of standard DNA for almost all molecular biology techniques including DNA sequencing (Arlinghaus et al., *Anal Chem.* 69:3747-53 (1997)), DNA fingerprinting (Guerasimova et al., *Biotechniques* 31:490-495 (2001)), diagnostic biochips (Prix et al., *Clin. Chem.* 48:428-35 (2002); Feriotto et al., *Lab Invest* 81:1415-1427 (2001)), and hybridization based microarray analysis (Weiler et al., *Nucleic Acids Res* 25:2792-2799 (1997); Igloi, *Genomics* 74:402-407 (2001)).

Techniques for forming sequences on a substrate are known. For example, the sequences may be formed according to the techniques disclosed in U.S. Pat. No. 5,143,854 to Pirrung et al., PCT Publication No. WO 92/10092, or U.S. Pat. No. 5,571,639 to Hubbell et al. Although there are several references on the attachment of biologically useful molecules to electrically insulating surfaces such as glass (http://www.piercenet.com/Technical/default.cfm?tmpl=. ./Lib/ViewDoc.cfm&doc=3483; McGovern et al., *Langmuir* 10:3607-3614 (1994)) or silicon oxide (Examples 4-6 of U.S. Pat. No. 6,159,695 to McGovern et al.), there are few examples of effective molecular attachment to electrically conducting surfaces except for gold (Bain et al., *Langmuir* 5:723-727 (1989)) and silver (Xia et al., *Langmuir* 22:269, (1998)). In general, the problem of attaching biologically active molecules to the surface of a substrate, whether it is a metal electrical conductor or an electrical insulator such as glass, is more difficult than the simple chemical reaction of a reactive group on the biological molecule with a complementary reactive group on the substrate. For example, a metal electrical conductor has no reactive sites, in principle, except those that may be adventitiously or deliberately positioned on the surface of the metal.

Hybridization of target DNAs to such surface bound capture probes poses difficulties not seen, if both species are soluble. Steric effects result from the solid support itself and from too high of a probe density. Studies have shown that hybridization efficiency can be altered by the insertion of a linker moiety that raises the complementary region of the probe away from the surface (Schepinov et al., *Nucleic Acid Res.* 25:1155-1161 (1997); Day et al., *Biochem J.* 278:735-740 (1991)), the density at which probes are deposited (Peterson et al., *Nucleic Acids Res.* 29:5163-5168 (2001); Wilkins et al., *Nucleic Acids Res.* 27:1719-1729)), and probe conformation (Riccelli et al., *Nucleic Acids Res.* 29:996-1004 (2001)). Insertion of a linker moiety between the complementary region of a probe and its attachment point can increase hybridization efficiency and optimal hybridization efficiency has been reported for linkers between 30 and 60 atoms in length. Likewise, studies of probe density suggest that there is an optimum probe density, and that this density is less than the total saturation of the surface (Schepinov et al., *Nucleic Acid Res.* 25:1155-1161 (1997); Peterson et al., *Nucleic Acids Res.* 29:5163-5168 (2001); Steel et al., *Anal. Chem.* 70:4670-4677 (1998)). For example, Peterson et al. reported that hybridization efficiency decreased from 95% to 15% with probe densities of $2.0 \times 10^{12}$ molecules/cm$^2$ and $12.0 \times 10^{12}$ molecules/cm$^2$, respectively.

Quantitation of hybridization events often depends on the type of signal generated from the hybridization reaction. The most common analysis technique is fluorescent emission from several different types of dyes and fluorophores. However, quantitating samples in this manner usually requires a large amount of the signaling molecule to be present to generate enough emission to be quantitated accurately. More importantly, quantitation of fluorescence generally requires expensive analysis equipment for linear response. Furthermore, the hybridization reactions take up to two hours, which for many uses, such as detecting biological warfare agents, is simply too long. Therefore, a need exists for a system which can rapidly detect and quantitate biological material in samples.

The present invention is directed to achieving these objectives.

SUMMARY OF THE INVENTION

One aspect of the present invention relates to a method for metallizing one or more sites of a nucleic acid molecule. This method involves providing palladium ions and contacting the palladium ions and a nucleic acid molecule under conditions effective to bind the palladium ions on one or more sites of the nucleic acid molecule. The nucleic acid molecule having palladium ions bound to one or more of its sites is then contacted with nickel or nickel alloy under conditions effective to deposit nickel or nickel alloy on the nucleic acid molecule.

Another aspect of the present invention relates to a method for detecting a target nucleic acid molecule in a sample. This method involves providing a device for detecting the presence of a target nucleic acid molecule in a sample. The device has two electrical conductors, including a first and second electrical conductor, which are not in contact with one another. The device also has one or more sets of two oligonucleotide probes attached to the electrical conductors. The probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes. The probes are contacted with a sample which may have the target nucleic acid molecule under selective hybridization conditions to permit target nucleic acid molecules, if any, present in the sample to hybridize to both of the probes and form a complex of the target nucleic acid molecule hybridized to the probes. Palladium ions are provided. The palladium ions are contacted with the device after the probes are contacted with the sample under conditions effective to bind the palladium ions on one or more sites of any of the complex of the target nucleic acid molecules hybridized to the probes. The device is contacted with nickel or nickel alloy under conditions effective to deposit nickel or nickel alloy on the complex. It is then determined if an electrical current can be carried between the probes. The electrical current between the probes indicates the presence of the target nucleic acid molecule in the sample.

A further aspect of the present invention relates to a method for metallizing one or more sites of a nucleic acid molecule. This method involves providing stannous ions and contacting the stannous ions and a nucleic acid molecule under conditions effective to bind stannous ions on one or more sites of the nucleic acid molecule. The nucleic acid molecule having stannous ions bound to one or more of its sites is then contacted with silver under conditions effective to deposit silver on the nucleic acid molecule.

Another aspect of the present invention relates to a method for detecting a target nucleic acid molecule in a sample. This method involves providing a device for detecting the presence of a target nucleic acid molecule in a sample. The device has two electrical conductors, including a first and second electrical conductor, which are not in contact with one another. The device also has one or more sets of two oligonucleotide probes attached to the electrical conductors. The probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes. The probes are contacted with a sample which may have the target nucleic acid molecule under selective hybridization conditions to permit target nucleic acid molecules, if any, present in the sample to hybridize to both of the probes and form a complex of the target nucleic acid molecule hybridized to the probes. Stannous ions are provided. The stannous ions are contacted with the device after the probes are contacted with the sample under conditions effective to bind the stannous ions on one or more sites of any of the complex of the target nucleic acid molecules hybridized to the probes. The device is contacted with silver under conditions effective to deposit silver on the complex. It is then determined if an electrical current can be carried between the probes. The electrical current between the probes indicates the presence of the target nucleic acid molecule in the sample.

An additional aspect of the present invention relates to a method of attaching nucleic acid molecules to electrically conductive surfaces. This method involves providing first and second electrical conductors comprised of nickel, the electrical conductors being located near, but not in contact with one another. The first electrical conductor is plated with gold from a gold cyanide solution. The second electrical conductor is plated with gold from a gold sulfite solution. A first set of oligonucleotide probes is then attached to the second electrical conductor with an attachment chemistry which binds the first set of oligonucleotide probes to the second electrical conductor but not to the first electrical conductor. The first and second electrical conductors are then contacted with a solution comprising a second set of oligonucleotide probes in an acidic pH buffer after said attaching. The acidic pH buffer alters the gold on the first electrical conductor but not on the second electrical conductor. As a result, the second set of oligonucleotide probes attach to the first electrical conductor with an attachment chemistry which binds the second set of oligonucleotide probes to the first electrical conductor.

A further aspect of the present invention relates to a method of attaching nucleic acid molecules to electrically conductive surfaces. This method involves providing first and second electrical conductors comprised of nickel, the electrical conductors being located near, but not in contact with one another. The first electrical conductor is plated with gold. A first set of oligonucleotide probes is then attached to the first electrical conductor with an attachment chemistry which binds the first set of oligonucleotide probes to the first electrical conductor but not to the second electrical conductor. The first electrical conductor is then contacted with a thiol-containing blocking agent under conditions effective to bind to gold at all sites not occupied by the first set of oligonucleotide probes. The second electrical conductor is plated with gold. A second set of oligonucleotide probes is then attached to the gold on the second electrical conductor but not the first electrical conductor with an attachment chemistry which binds the second set of oligonucleotide probes to the gold of the second electrical conductor.

An additional aspect of the present invention relates to a method of attaching nucleic acid molecules to electrically conductive surfaces. This method involves providing first and second electrical conductors comprised of gold. The electrical conductors are located near, but not in contact with one another. The first electrical conductor is plated with a cover layer of a metal other than gold. A first set of oligonucleotide probes is attached to the second electrical conductor with an attachment chemistry which binds the first set of oligonucleotide probes to the second electrical conductor but not to the first electrical conductor. The cover layer is then removed from the first electrical conductor. A second set of oligonucleotide probes is then attached to the first electrical conductor but not the second electrical conductor with an attachment chemistry which binds the first set of oligonucleotide probes to the first electrical conductor.

Another aspect of the present invention relates to a method of attaching nucleic acid molecules to electrically conductive surfaces. This method involves providing first and second electrical conductors. The electrical conductors are located near, but not in contact with one another. The second electrical conductor is comprised of gold and the first electrical conductor is comprised of an outer layer of metal other than gold. A first set of oligonucleotide probes is then attached to the second electrical conductor with an attachment chemistry which binds the first set of oligonucleotide probes to the second electrical conductor but not to the first electrical conductor. The first electrical conductor is plated with gold such that the gold covers the layer of metal. A second set of oligonucleotide probes is then attached to the first electrical conductor but not the second electrical conductor with an attachment chemistry which binds the second set of oligonucleotide probes to the first electrical conductor but not to the second electrical conductor.

A further aspect of the present invention relates to a method for detecting a target nucleic acid molecule in a sample. This method involves providing a device for detecting the presence of a target nucleic acid molecule in a sample. The device has two electrical conductors, including a first and second electrical conductor, which are not in contact with one another. The device also has one or more sets of two oligonucleotide probes attached to the electrical conductors. The probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes. The probes are contacted with a sample which may have the target nucleic acid molecule under selective hybridization conditions to permit target nucleic acid molecules, if any, present in the sample to hybridize to both of the probes and form a complex of the target nucleic acid molecule hybridized to the probes. Metal ions are attached to the probes and any target nucleic acid molecule. The presence of the target nucleic acid molecule in the sample is determined by detecting the scatter of light caused by the metal ions attached to the probes and any target nucleic acid molecule.

BRIEF DESCRIPTION OF THE DRAWINGS

FIGS. 1A-B show a perspective view of a system for detection of a target nucleic acid molecule from a sample which includes a desk-top detection unit and a cartridge which is inserted into the desk-top unit. FIG. 1C shows a schematic view of this system.

DETAILED DESCRIPTION OF THE INVENTION

Figure 2A:
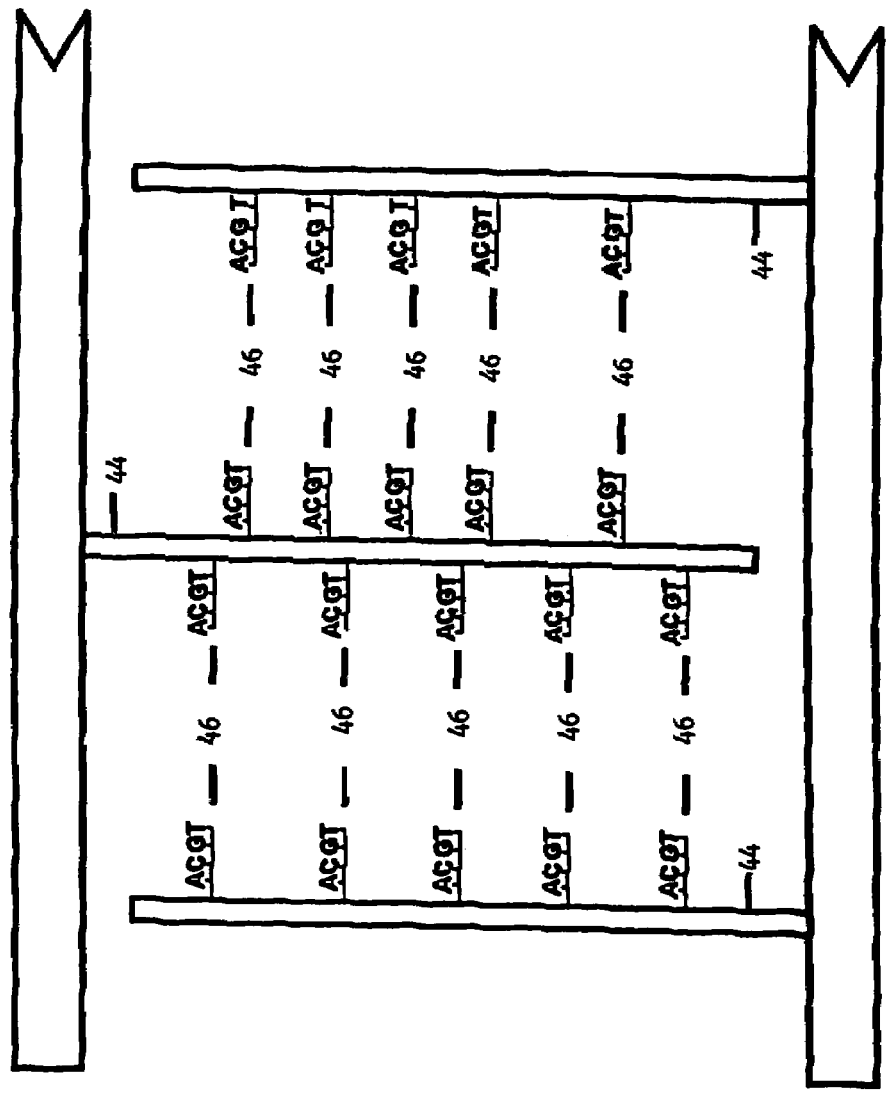
FIG. 2A depicts a single test structure on a detection chip suitable to be positioned in first chamber 20 of the system shown in FIGS. 1A-C, where oligonucleotide probes are attached to electrical conductors in the form of spaced apart conductive fingers.

One aspect of the present invention relates to a method for metallizing one or more sites of a nucleic acid molecule. This method involves providing palladium ions and contacting the palladium ions and a nucleic acid molecule under conditions effective to bind the palladium ions on one or more sites of the nucleic acid molecule. The nucleic acid molecule having palladium ions bound to one or more of its sites is then contacted with nickel or nickel alloy under conditions effective to deposit nickel or nickel alloy on the nucleic acid molecule.

In carrying out this method, palladium ions are preferably provided in the form of a solution. A suitable solution of palladium ions is comprised of palladium acetate, acetone, and water. Another suitable solution of palladium ions is comprised of an aqueous solution of palladium chloride adjusted to a pH range of about 3.0-7.0. Contacting the palladium ions and the nucleic acid molecule is preferably carried out for about 1 second to about 1 hour, more preferably for about 5 minutes to about 15 minutes. Palladium ions bound to one or more sites of the nucleic acid molecule act as catalysts for the deposition of nickel onto the nucleic acid molecule.

Nickel can be provided in the form of a commercial electroless nickel plating solution. For example, a suitable electroless nickel plating solution can be obtained from Transene Company, Inc. (Danvers, Mass.). Alternatively, nickel can be provided in the form of a nickel bath, such as described in U.S. Pat. No. 4,552,848 to Yudelson et al., which is hereby incorporated by reference in its entirety. Nickel can also be provided in the form of nickel alloy, as described in U.S. Pat. No. 3,935,013 to Lelental, which is hereby incorporated by reference in its entirety. A suitable nickel alloy is comprised of nickel and copper in a ratio of about 99:1 to about 60:40. Deposition of nickel onto the nucleic acid molecule is achieved by contacting the bound palladium ions with nickel or nickel alloy for about 1 second to about 1 hour, more preferably for about 3 minutes to about 30 minutes.

For purposes of the present invention, it is preferable that the catalyst strongly associate with the nucleic acid molecule to prevent general and spontaneous deposition of the metal on sites other than the nucleic acid molecule. Palladium ions strongly associate with the nucleic acid molecule and, thus, prevent general and spontaneous deposition of the metal on sites other than the nucleic acid molecule. In addition, to ensure that palladium ions are not present on sites other than the nucleic acid molecule, excess (e.g., unbound) palladium ions are washed away prior to contacting the nucleic acid molecule with nickel or nickel alloy.

Another aspect of the present invention relates to a method for metallizing one or more sites of a nucleic acid molecule. This method involves providing stannous ions and contacting the stannous ions and a nucleic acid molecule under conditions effective to bind stannous ions on one or more sites of the nucleic acid molecule. The nucleic acid molecule having stannous ions bound to one or more of its sites is then contacted with silver under conditions effective to deposit silver on the nucleic acid molecule.

In carrying out this method, stannous ions are preferably provided in the form of stannous chloride. Contacting the stannous ions and the nucleic acid molecule is preferably carried out for about 1 second to about 1 hour, more preferably for about 5 minutes to about 15 minutes. Upon binding one or more sites of the nucleic acid molecule, the stannous ions act as catalysts for the deposition of silver onto the nucleic acid molecule.

Silver can be provided in the form of a commercial electroless silver plating solution. For example, a suitable electroless silver plating solution can be obtained from Peacock Labs., Inc. (Philadelphia, Pa.). Deposition of silver onto the nucleic acid molecule is achieved by contacting the bound stannous ions with the electroless silver plating solution for about 1 second to about 1 hour, more preferably for about 1 minute to about 30 minutes.

Stannous ions strongly associate with the nucleic acid molecule, and thus prevent general and spontaneous deposition of the metal on sites other than the nucleic acid molecule. In addition, to ensure that stannous ions are not present on sites other than the nucleic acid molecule, excess (e.g., unbound) stannous ions are washed away prior to contacting the nucleic acid molecule with silver.

A further aspect of the present invention relates to a method for detecting a target nucleic acid molecule in a sample. This method involves providing a device for detecting the presence of a target nucleic acid molecule in a sample. The device has two electrical conductors, including a first and second electrical conductor, which are not in contact with one another. The device also has one or more sets of two oligonucleotide probes attached to the electrical conductors. The probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes. The probes are contacted with a sample which may have the target nucleic acid molecule under selective hybridization conditions to permit target nucleic acid molecules, if any, present in the sample to hybridize to both of the probes and form a complex of the target nucleic acid molecule hybridized to the probes. Palladium ions are provided. The palladium ions are contacted with the device after the probes are contacted with the sample under conditions effective to bind the palladium ions on one or more sites of any of the complex of the target nucleic acid molecules hybridized to the probes. The device is contacted with nickel or nickel alloy under conditions effective to deposit nickel or nickel alloy on the complex. It is then determined if an electrical current can be carried between the probes, the electrical current between the probes indicating the presence of the target nucleic acid molecule in the sample.

Another aspect of the present invention relates to a method for detecting a target nucleic acid molecule in a sample. This method involves providing a device for detecting the presence of a target nucleic acid molecule in a sample. The device has two electrical conductors, including a first and second electrical conductor, which are not in contact with one another.

The device also has one or more sets of two oligonucleotide probes attached to the electrical conductors. The probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes. The probes are contacted with a sample which may have the target nucleic acid molecule under selective hybridization conditions to permit target nucleic acid molecules, if any, present in the sample to hybridize to both of the probes and form a complex of the target nucleic acid molecule hybridized to the probes. Stannous ions are provided. The stannous ions are contacted with the device after the probes are contacted with the sample under conditions effective to bind the stannous ions on one or more sites of any of the complex of the target nucleic acid molecules hybridized to the probes. The device is contacted with silver under conditions effective to deposit silver on the complex. It is then determined if an electrical current can be carried between the probes, the electrical current between the probes indicating the presence of the target nucleic acid molecule in the sample.

Yet another aspect of the present invention relates to a method for detecting a target nucleic acid molecule in a sample. This method involves providing a device for detecting the presence of a target nucleic acid molecule in a sample. The device has two electrical conductors, including a first and second electrical conductor, which are not in contact with one another. The device also has one or more sets of two oligonucleotide probes attached to the electrical conductors. The probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes. The probes are contacted with a sample which may have the target nucleic acid molecule under selective hybridization conditions to permit target nucleic acid molecules, if any, present in the sample to hybridize to both of the probes and form a complex of the target nucleic acid molecule hybridized to the probes. Metal ions are attached to the probes and any target nucleic acid molecule. The presence of the target nucleic acid molecule in the sample is determined by detecting the scatter of light caused by the metal ions attached to the probes and any target nucleic acid molecule.

The method of detecting nucleic acid sequences from a sample involves a sample collection method whereby bacteria, viruses, or other DNA containing species are collected and concentrated. This method also incorporates a sample preparation method that involves the liberation of the genetic components. After liberating the nucleic acid, the sample is injected into a detection chip containing complementary nucleic acid probes for the target of interest. In this manner, the device may contain multiple sets of probe molecules that each recognizes a single but different nucleic acid sequence. This process ultimately involves the detection of hybridization products.

In the collection phase, bacteria, viruses, or other DNA containing samples are collected and concentrated. A plurality of collection methods will be used depending on the type of sample to be analyzed. Liquid samples will be collected by placing a constant volume of the liquid into a lysis buffer. Airborne samples can be collected by passing air over a filter for a constant time. The filter will be washed with lysis buffer. Alternatively, the filter can be placed directly into the lysis buffer. Waterborne samples can be collected by passing a constant amount of water over a filter. The filter can then be washed with lysis buffer or soaked directly in the lysis buffer. Dry samples can be directly deposited into lysis buffer for removal of the organism of interest.

After sample collection and lysis, cell debris can be removed by precipitation or filtration. Ideally, the sample will be concentrated by filtration, which is more rapid and does not require special reagents. Samples will be forced through filters that will allow only the cellular material to pass through, trapping whole organisms and broken cell debris.

The detection device described in this invention can be as simple as a device recognizing a single DNA sequence and hence a single organism, or as complex as recognizing multiple DNA sequences. Therefore, different types of devices can be constructed depending on the complexity of the application.

To put the present invention in perspective, a suitable device of the present invention and its use are shown in FIGS. 1A-B. FIGS. 1A-B show a perspective view of a system for detection of a target nucleic acid molecule from a sample. This system includes a desk-top detection unit and a detection cartridge which is inserted into the desk-top unit. In this embodiment, desk-top detection unit 2 is provided with door 4 for filling reagents, control buttons 6, and visual display 10. Slot 8 in desk-top detection unit 2 is configured to receive detection cartridge 12. Detection cartridge 12 further contains first injection port 14 through which a sample solution can be introduced into a first chamber in cartridge 12 and second injection port 16 through which reagents can be introduced into the first chamber.

FIG. 1C shows a schematic view of the system utilizing desk-top detection unit 2 and cartridge 12. In this system, desk-top detection unit 2 contains containers 32A-C suitable for holding reagents and positioned to discharge the reagents into first chamber 20 of detection cartridge 12 through second injection port 16 and conduit 21. Containers 32A-C can, for example, carry a neutralizer, a buffer, a conductive ion solution, and an enhancer. The contents of these containers can be replenished through door 4. This is achieved by making containers 32A-C sealed and disposable or by making them refillable.

28 removes reagents from containers 32A-C, through tubes 30A-C, respectively, and discharges them through tube 26 and second injection port 16 into detection cartridge 12. Instead of using single pump 28 to draw reagents from containers 32A-C, a separate pump can be provided for each of containers 32A-C so that their contents can be removed individually.

Alternatively, the necessary reagents may be held in containers inside the detection cartridge. The pumps in the detection unit can force a material, such as air, water, or oil, into the detection cartridge to force the reagents from the respective containers and into the first chamber. The reagents are then changed with each detection cartridge, which eliminates the buildup of salt precipitates in the detection unit.

Desk-top detection unit 12 is also provided with controller 38, which is in electrical communication with the electrical conductors of the detection cartridge 12 by means of electrical connector 36, to detect the presence of the target molecule in the sample. Controller 38 also operates pump 28 by way of electrical connector 34. Alternatively, separate controllers can be used for operating the pumps and the detection of target molecules. Digital coupling 40 permits controller 38 to communicate data to computer 42 which is external of desk-top detection unit 12.

Detection cartridge 12 contains first chamber 20 which, as noted supra, receives reagents from within desk-top detection unit 2 by way of second injection port 16 and conduit 21. A sample to be analyzed is discharged to first chamber 20 through first injection port 14 and conduit 18. As described more fully infra, the presence of a target molecule is detected in first chamber 20. Detection cartridge 12 is further provided with second chamber 24 for collecting material discharged from first chamber 20 by way of connector 22. The detection cartridge also contains electrical connector 25 extending through the housing and coupled to the electrically separated conductors in first chamber 20 so that the presence of a target molecule in a sample can be detected.

Figure 2B:
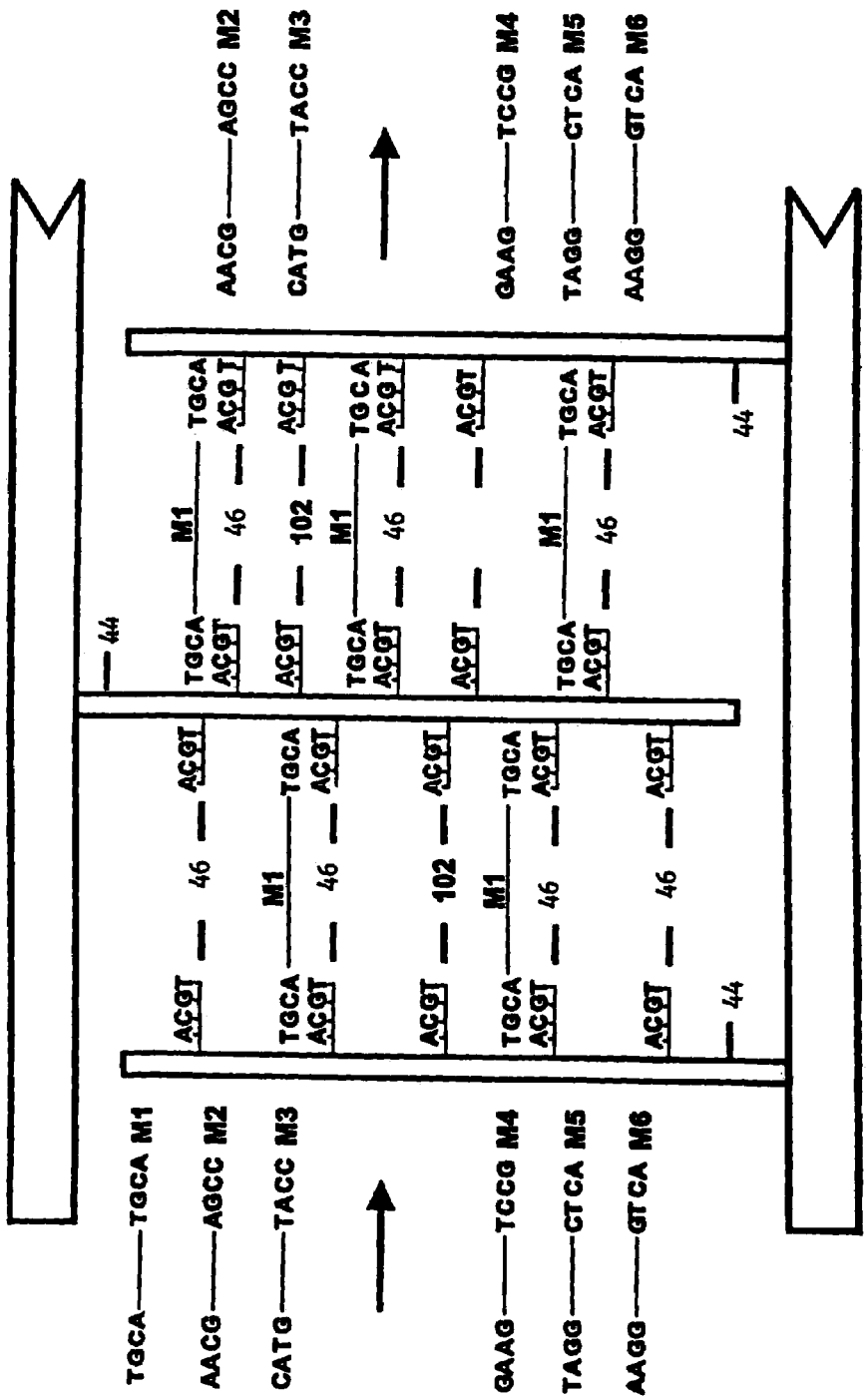
FIG. 2B shows how a target nucleic acid molecule present in a sample is detected by the detection chip.

FIG. 2A depicts a single test structure on a detection chip suitable to be positioned in first chamber 20 of the system shown in FIGS. 1A-C. According to FIG. 2A, oligonucleotide probes 46 attached to spaced apart conductive fingers 44 are physically located at a distance sufficient that they cannot come into contact with one another. A sample, containing a mixture of nucleic acid molecules (i.e. M1-M6), to be tested is contacted with the fabricated device on which conductive fingers 44 are fixed, as shown in FIG. 2B. If a target nucleic acid molecule (i.e. M1) that is capable of binding to the two oligonucleotide probes is present in the sample, the target nucleic acid molecule will bind to the two probe molecules. If bound, the nucleic acid molecule can bridge the gap between the two electrodes and provide an electrical connection. Any unhybridized nucleic acid molecules (i.e. M2-M6) not captured by the probes is washed away.

Here, the electrical conductivity of nucleic acid molecules can be relied upon to transmit the electrical signal. Hans-Werner Fink and Christian Schoenenberger reported in *Nature* 398:407-410 (1999), which is hereby incorporated by reference in its entirety, that DNA conducts electricity like a semiconductor. This flow of current can be sufficient to construct a simple switch, which will indicate whether or not a target nucleic acid molecule is present within a sample. The presence of a target molecule can be detected as an "on" switch, while a set of probes not connected by a target molecule would be an "off" switch. The information can be processed by a digital computer which correlates the status of the switch with the presence of a particular target. The information can be quickly identified to the user as indicating the presence or absence of the biological material, organism, mutation, or other target of interest.

In a preferred embodiment of the present invention, after the target molecules have hybridized to sets of biological probes, the target molecule is contacted with metal ions (e.g., palladium ions, stannous ions, as described supra) under conditions effective to bind the metal ions on one or more sites of the target molecule. The target molecule with bound metal ions on one or more of its sites is then contacted with a metal (e.g., nickel, nickel alloy, silver, as described supra) under conditions effective to deposit metal on the target molecules hybridized to the probes. Alternatively, metal particles may be mordanted on one or more sites of the nucleic acid molecule and metal deposited upon the mordanted nucleic acid molecule as described in U.S. Patent Application Ser. No. 60/533,342, which is hereby incorporated by reference in its entirety. The target nucleic acid molecule can then conduct electricity across the gap between the pair of probes. As described supra, this flow of current can be sufficient to construct a simple switch, which will indicate whether or not a target nucleic acid molecule is present within a sample.

The detection of a target molecule using a desk-top detection system, as shown in FIGS. 1A-C, can be carried out as follows. After lysis and clarification of the sample, the sample is introduced into detection cartridge 12 through first injection port 14 and conduit 18 and into first chamber 20. Once the sample is introduced, detection cartridge 12 is inserted into slot 8 of desk-top detection unit 2 so that second injection port 16 is connected to conduit 21 and electrical connector 36 is coupled to electrical connector 25. The sample is processed in first chamber 20 containing the capture probes and electrical conductors for a period of time sufficient for detection of a target nucleic acid molecule in the sample. Processing of the sample within first chamber 20 can involve neutralizing the sample, contacting the neutralized sample with a buffer, contacting the sample with a metal ion (e.g., palladium ions, stannous ions), then contacting the sample with a metal (e.g., silver, nickel, nickel alloy). Molecules that are not captured are expelled from first chamber 20 through second conduit 22 and into second chamber 24. The desk-top detection system can be programmed by a series of operation buttons 6 on the front of the device and the results can be seen on visual display 10.

The detection chip, on which conductive fingers 44 are fixed, is constructed on a support. Examples of useful support materials include glass, quartz, and silicon as well as polymeric substrates, e.g., plastics. In the case of conductive or semi-conductive supports, it will generally be desirable to include an insulating layer on the support. However, any solid support which has a non-conductive surface may be used to construct the device. The support surface need not be flat. In fact, the support may be on the walls of a chamber in a chip.

Figure 3:
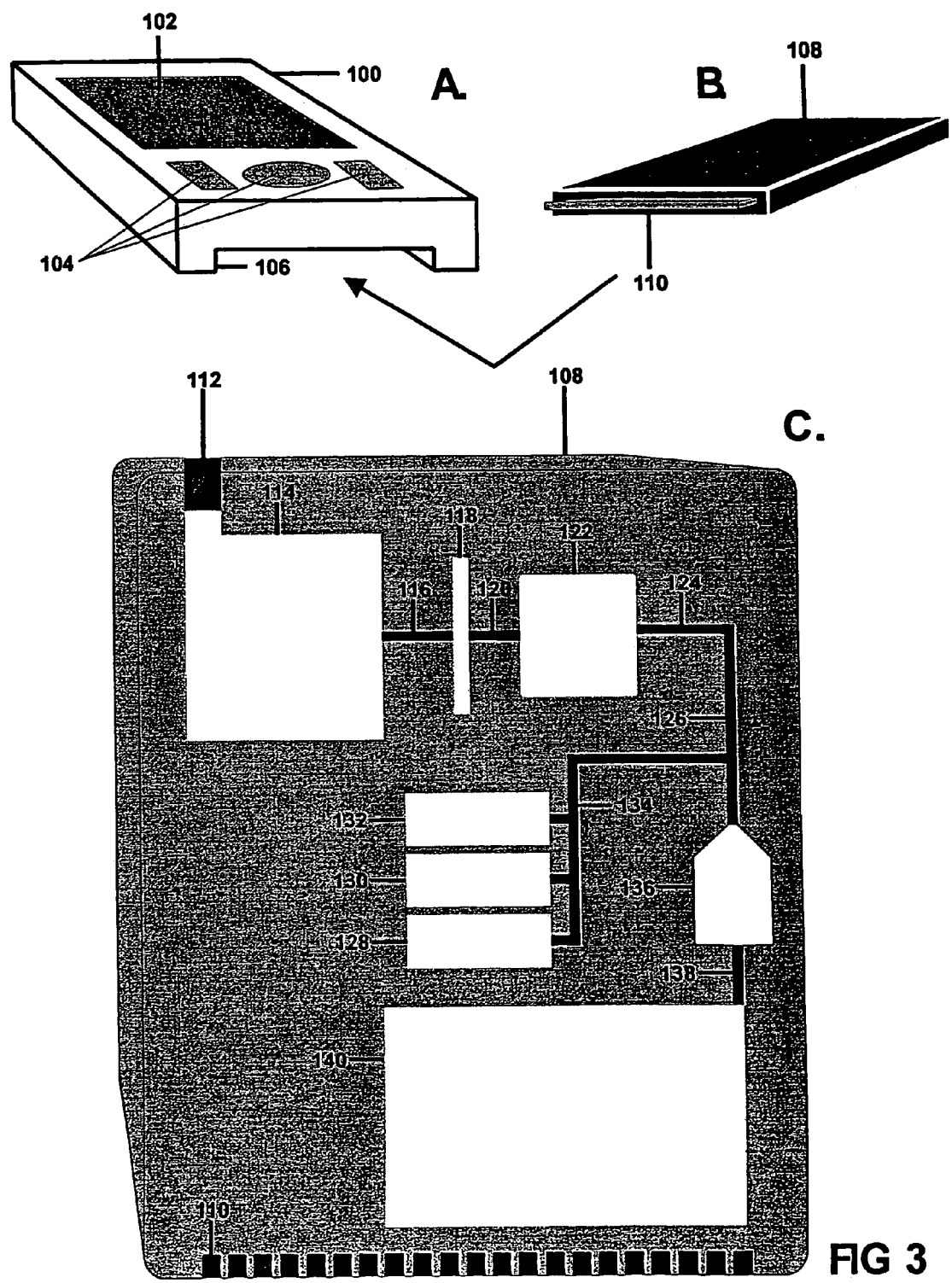
FIGS. 3A-B show a perspective view of a system for detection of a target nucleic acid molecule which includes a portable detection unit and a cartridge which is inserted into the portable unit.
FIG. 3C shows a schematic view of this system.

FIGS. 3A-B show a portable detection system. This system is provided with a portable unit 100 which can be in the form of a portable personal digital assistant (e.g., a Palm® unit, 3Com Corporation, Santa Clara, Calif.). Portable unit 100 is provided with visual display 102 and control buttons 104. Slot 106 is provided to receive detection cartridge 108 having electrical connector 110.

FIG. 3C shows a schematic diagram of detection cartridge 108 which is used in the portable detection system of the present invention. Detection cartridge 108 contains first injection port 112 in the housing through which a sample solution can be introduced. Detection cartridge 108 contains a plurality of containers 128, 130, and 132 suitable for holding reagents and positioned to discharge the reagents into conduit 126 through conduit 134. Containers 128, 130, and 132 can, for example, carry a neutralizer, a buffer, and a conductive ion solution.

Sample pre-treatment chamber 114 is positioned upstream of first chamber 122, with filter 118 being positioned between pretreatment chamber 114 and first chamber 122. Conduits 116 and 120 provide a path between pretreatment chamber 114 and first chamber 122. Detection cartridge 108 also contains conduit 124 that receives material from chamber 122. Conduit 124 has a small diameter so that nucleic acid material is sheared as it passes from first chamber 122 to detection chamber 136. Detection cartridge 108 also contains a waste chamber 140 coupled to detection chamber 136 by way of conduit 138 so that material discharged from the detection chamber 136 is received in waste chamber 140. Detection cartridge 108 includes a series of electrical connectors 110 that are coupled to the electrically separated conductors in detection chamber 136, like those shown in first chamber 20 for the embodiment of FIGS. 1A-C and 2.

In operation, the detection of a target molecule using a portable detection system, as shown in FIGS. 3A-C, can be carried out as follows. After lysis and clarification of the sample, the sample solution is introduced into detection cartridge 108 through first injection port 112. Within sample pretreatment chamber 114, cells are lysed to release cellular contents. After denaturation and deprotination, the sample can be partially purified by passing it through filter 118 and depositing the solution into chamber 122. Within first chamber 138, the neutralized target nucleic acid molecule, if present in the sample, is permitted to hybridize with the capture probes on the electrically separated conductors in first chamber 136 in substantially the same way as described above with reference to FIGS. 1A-C and 2. After binding and washing, the sample is contacted with a metal ion from container 128, such that metal ions are bound on the target molecules that have hybridized to the capture probes on the detection chip. Additionally, the bound target molecules are contacted with a metal from container 130 to deposit metal on to the target molecules hybridized to the probes. Excess buffers and waste buffers will exit detection chamber 136 through waste tube 138 and collect in second chamber 140. The portable detection system can be programmed by operation of a series of buttons 104 on the front of portable unit 100, and the results are visualized on screen 102.

In carrying out the method of the present invention, a sample collection phase is initially carried out where bacteria, viruses, or other species are collected and concentrated. The target nucleic acid molecule whose sequence is to be determined is usually isolated from a tissue sample. If the target nucleic acid molecule is genomic, the sample may be from any tissue (except exclusively red blood cells). For example, whole blood, peripheral blood lymphocytes or peripheral blood mononuclear cells ("PBMC"), skin, hair, or semen are convenient sources of clinical samples. These sources are also suitable if the target is RNA. Blood and other body fluids are also a convenient source for isolating viral nucleic acids. If the target nucleic acid molecule is mRNA, the sample is obtained from a tissue in which the mRNA is expressed. If the target nucleic acid molecule in the sample is RNA, it may be reverse transcribed to DNA, but need not be converted to DNA in the present invention.

A plurality of collection methods can be used depending on the type of sample to be analyzed. Liquid samples can be collected by placing a constant volume of the liquid into a lysis buffer. Airborne samples can be collected by passing air over a filter for a constant time. The filter can be washed with lysis buffer. Alternatively, the filter can be placed directly into the lysis buffer. Waterborne samples can be collected by passing a constant amount of water over a filter. The filter can then be washed with lysis buffer or soaked directly in the lysis buffer. Dry samples can be directly deposited into lysis buffer for removal of the organism of interest.

When whole cells, viruses, or other tissue samples are being analyzed, it is typically necessary to extract the nucleic acids from the cells or viruses, prior to continuing with the various sample preparation operations. Accordingly, following sample collection, nucleic acids may be liberated from the collected cells, viral coat, etc., into a crude extract, followed by additional treatments to prepare the sample for subsequent operations such as denaturation of contaminating (DNA binding) proteins, purification, filtration, and desalting.

Liberation of nucleic acids from the sample cells or viruses, and denaturation of DNA binding proteins may generally be performed by physical or chemical methods. For example, chemical methods generally employ lysing agents to disrupt the cells and extract the nucleic acids from the cells, followed by treatment of the extract with chaotropic salts such as guanidinium isothiocyanate or urea, to denature any contaminating and potentially interfering proteins. Generally, where chemical extraction and/or denaturation methods are used, the appropriate reagents may be incorporated within the extraction chamber, a separate accessible chamber, or externally introduced.

Alternatively, physical methods may be used to extract the nucleic acids and denature DNA binding proteins. U.S. Pat. No. 5,304,487, which is hereby incorporated by reference in its entirety, discusses the use of physical protrusions within microchannels or sharp edged particles within a chamber or channel to pierce cell membranes and extract their contents. More traditional methods of cell extraction may also be used, e.g., employing a channel with restricted cross-sectional dimension which causes cell lysis when the sample is passed through the channel with sufficient flow pressure. Alternatively, cell extraction and denaturing of contaminating proteins may be carried out by applying an alternating electrical current to the sample. More specifically, the sample of cells is flowed through a microtubular array while an alternating electric current is applied across the fluid flow. A variety of other methods may be utilized within the device of the present invention to effect cell lysis/extraction, including, e.g., subjecting cells to ultrasonic agitation, or forcing cells through microgeometry apertures, thereby subjecting the cells to high shear stress resulting in rupture.

Following extraction, it is often desirable to separate the nucleic acids from other elements of the crude extract, e.g., denatured proteins, cell membrane particles, and the like. Removal of particulate matter is generally accomplished by filtration, flocculation, or the like. Ideally, the sample is concentrated by filtration, which is more rapid and does not require special reagents. A variety of filter types may be readily incorporated into the device. Samples can be forced through filters that will allow only the cellular material to pass through, trapping whole organisms and broken cell debris. Further, where chemical denaturing methods are used, it may be desirable to desalt the sample prior to proceeding to the next step. Desalting of the sample, and isolation of the nucleic acid may generally be carried out in a single step, e.g., by binding the nucleic acids to a solid phase and washing away the contaminating salts or performing gel filtration chromatography on the sample. Suitable solid supports for nucleic acid binding include, e.g., diatomaceous earth, silica, or the like. Suitable gel exclusion media is also well known in the art and is commercially available from, e.g., Pharmacia and Sigma Chemical. This isolation and/or gel filtration/desalting may be carried out in an additional chamber, or alternatively, the particular chromatographic media may be incorporated in a channel or fluid passage leading to a subsequent reaction chamber.

The probes are preferably selected to bind with the target such that they have approximately the same melting temperature. This can be done by varying the lengths of the hybridization region. A-T rich regions may have longer target sequences, whereas G-C rich regions would have shorter target sequences.

Hybridization assays on substrate-bound oligonucleotide arrays involve a hybridization step and a detection step. In the hybridization step, the sample potentially containing the target and an isostabilizing agent, denaturing agent, or renaturation accelerant is brought into contact with the probes of the array and incubated at a temperature and for a time appropriate to allow hybridization between the target and any complementary probes.

Including a hybridization optimizing agent in the hybridization mixture significantly improves signal discrimination between perfectly matched targets and single-base mismatches. As used herein, the term "hybridization optimizing agent" refers to a composition that decreases hybridization between mismatched nucleic acid molecules, i.e., nucleic acid molecules whose sequences are not exactly complementary.

An isostabilizing agent is a composition that reduces the base-pair composition dependence of DNA thermal melting transitions. More particularly, the term refers to compounds that, in proper concentration, result in a differential melting temperature of no more than about 1° C. for double stranded DNA oligonucleotides composed of AT or GC, respectively. Isostabilizing agents preferably are used at a concentration between 1 M and 10 M, more preferably between 2 M and 6 M, most preferably between 4 M and 6 M, between 4 M and 10 M, and, optimally, at about 5 M. For example, a 5 M agent in 2×SSPE (Sodium Chloride/Sodium Phosphate/EDTA solution) is suitable. Betaines and lower tetraalkyl ammonium salts are examples of suitable isostabilizing agents.

Betaine (N,N,N,-trimethylglycine; (Rees et al., *Biochem.* 32:137-144 (1993)), which is hereby incorporated by reference in its entirety) can eliminate the base pair composition dependence of DNA thermal stability. Unlike tetramethylammonium chloride ("TMACl"), betaine is zwitterionic at neutral pH and does not alter the polyelectrolyte behavior of nucleic acids while it does alter the composition-dependent stability of nucleic acids. Inclusion of betaine at about 5 M can lower the average hybridization signal, but increases the discrimination between matched and mismatched probes.

A denaturing agent is a composition that lowers the melting temperature of double stranded nucleic acid molecules by interfering with hydrogen bonding between bases in a double-stranded nucleic acid or the hydration of nucleic acid molecules. Denaturing agents can be included in hybridization buffers at concentrations of about 1 M to about 6 M and, preferably, about 3 M to about 5.5 M.

Denaturing agents include formamide, formaldehyde, dimethylsulfoxide ("DMSO"), tetraethyl acetate, urea, guanidine thiocyanate ("GuSCN"), glycerol and chaotropic salts. As used herein, the term "chaotropic salt" refers to salts that function to disrupt van der Waal's attractions between atoms in nucleic acid molecules. Chaotropic salts include, for example, sodium trifluoroacetate, sodium tricholoroacetate, sodium perchlorate, and potassium thiocyanate.

A renaturation accelerant is a compound that increases the speed of renaturation of nucleic acids by at least 100-fold. They generally have relatively unstructured polymeric domains that weakly associate with nucleic acid molecules. Accelerants include heterogenous nuclear ribonucleoprotein ("hnRP") A1 and cationic detergents such as, preferably, cetyltrimethylammonium bromide ("CTAB") and dodecyl trimethylammonium bromide ("DTAB"), and, also, polylysine, spermine, spermidine, single stranded binding protein ("SSB"), phage T4 gene 32 protein, and a mixture of ammonium acetate and ethanol. Renaturation accelerants can be included in hybridization mixtures at concentrations of about 1 µM to about 10 mM and, preferably, 1 µM to about 1 mM. The CTAB buffers work well at concentrations as low as 0.1 mM.

Addition of small amounts of ionic detergents (such as N-lauroyl-sarkosine) to the hybridization buffers can also be useful. LiCl is preferred to NaCl. Hybridization can be at 20°-65° C., usually 37° C. to 45° C. for probes of about 14 nucleotides. Additional examples of hybridization conditions are provided in several sources, including: Sambrook et al., *Molecular Cloning: A Laboratory Manual*, 2nd Ed., Cold Spring Harbor, N.Y. (1989); and Berger and Kimmel, "Guide to Molecular Cloning Techniques," *Methods in Enzymology*, Volume 152, Academic Press, Inc., San Diego, Calif. (1987); Young and Davis, *Proc. Natl. Acad. Sci. USA*, 80:1194 (1983), which are hereby incorporated by reference in their entirety.

In addition to aqueous buffers, non-aqueous buffers may also be used. In particular, non-aqueous buffers which facilitate hybridization but have low electrical conductivity are preferred.

The sample and hybridization reagents are placed in contact with the array and incubated. Contact can take place in any suitable container, for example, a dish or a cell specially designed to hold the probe array and to allow introduction and removal of fluids. Generally, incubation will be at temperatures normally used for hybridization of nucleic acids, for example, between about 20° C. and about 75° C., e.g., about 25° C., about 30° C., about 35° C., about 40° C., about 45° C., about 50° C., about 55° C., about 60° C., or about 65° C. For probes longer than about 14 nucleotides, 37-45° C. is preferred. For shorter probes, 55-65° C. is preferred. More specific hybridization conditions can be calculated using formulae for determining the melting point of the hybridized region. Preferably, hybridization is carried out at a temperature at or between ten degrees below the melting temperature and the melting temperature. More preferred, hybridization is carried out at a temperature at or between five degrees below the melting temperature and the melting temperature. The target is incubated with the capture probes for a time sufficient to allow the desired level of hybridization between the target and any complementary capture probes. After incubation with the hybridization mixture, the electrically separated conductors are washed with the hybridization buffer, which also can include the hybridization optimizing agent. These agents can be included in the same range of amounts as for the hybridization step, or they can be eliminated altogether.

Details on how oligonucleotide probes are attached to electrical conductors are set forth in U.S. patent application Ser. No. 10/159,429, which is hereby incorporated by reference in its entirety.

In addition, the present invention relates to new methods of attaching nucleic acid molecules to electrically conductive surfaces, which ensure that oligonucleotide probes corresponding to opposite ends of a target molecule are attached to electrically separated conductors. Oligonucleotide probes corresponding to opposite ends of the target molecule should be attached to adjacent electrically conductive surfaces. This way, the target molecule is able to bridge the gap between the electrically conductive surfaces upon hybridization to the oligonucleotide probes. In contrast, if the oligonucleotide probes are attached to different regions of the same electrically conductive surface, the target molecule hybridized to the oligonucleotide probes will fail to carry a detectable electrical signal between the two electrical conductors.

In one aspect of the present invention, nucleic acid molecules are attached to electrically conductive surfaces by providing first and second electrical conductors comprised of nickel, the electrical conductors being located near, but not in contact with one another. The first electrical conductor is plated with gold from a gold cyanide solution. The second electrical conductor is plated with gold from a gold sulfite solution. A first set of oligonucleotide probes is then attached to the second electrical conductor with an attachment chemistry which binds the first set of oligonucleotide probes to the second electrical conductor but not to the first electrical conductor. The first and second electrical conductors are then contacted with a solution comprising a second set of oligonucleotide probes in an acidic pH buffer after said attaching. The acidic pH buffer alters the gold on the first electrical conductor but not on the second electrical conductor such that the second set of oligonucleotide probes attach to the first electrical conductor with an attachment chemistry which binds the second set of oligonucleotide probes to the first electrical conductor.

Gold can be electroplated onto nickel electrical conductors from a gold cyanide solution and a gold sulfite solution. Gold which has been electroplated onto nickel electrical conductors from a gold cyanide solution retains cyanide ions on its surface. These cyanide ions function as a blocking agent, and block the attachment of thiol-terminated oligonucleotides. Therefore, when the first and second electrical conductors are bathed in a solution containing a first set of oligonucleotide probes in a neutral or basic pH buffer, the probes will only attach to the sulfite plated gold, which is not blocked by the cyanide ions. No significant amount of the probes goes to the cyanide blocked gold electrical conductor. When the sulfite gold electrical conductor is saturated with the first set of probes, the electrical conductors are bathed in a solution containing a second set of oligonucleotide probes in acidic pH buffer. The acid from the buffer solution removes the cyanide ions and the thiol-terminated second set probes attach to the now un-blocked gold electrical conductor. The final result is a first set of oligonucleotide probes on the sulfite-plated electrical conductor and a second set of oligonucleotide probes on the cyanide-plated electrical conductor. When such electrical conductors are contacted with a target nucleic acid having end base sequences complementary to the sequences of the first and second oligonucleotide probes, respectively, under hybridization conditions, the target nucleic acid will form a nucleic acid bridge from the first electrical conductor to the second electrical conductor. Furthermore, no target nucleic acid molecules will be able to form unproductive bridges between oligonucleotide probes attached to the same electrical conductor because each electrical conductor will have only probes complementary to one end of the target nucleic acid molecule.

The separation of the first and second electrical conductors in these structures is very small, on the order of about one micron, which is small enough so that a reasonable sized target DNA molecule (i.e., about 3000 to 5000 base pairs) can reach from a first electrical conductor to a second electrical conductor to form a bridge. In addition, the width of the electrical conductors is also small, about 2 microns, so that oligonucleotide probes bound near the center of a first electrical conductor can still form bridges with target DNA on a second electrical conductor. Given the minute size of the electrical conductors and the space between them, mechanical attachment of oligonucleotide probes is practically impossible. The methods of the present invention provide for the attachment of oligonucleotide probes without the need of mechanical placement.

Successful deposition of gold onto metal electrical conductors depends on such factors as the type of metal used for the electrical conductors, the size and area of the electrical conductors, the voltage, current, and time of electrodeposition, and the concentration and chemical makeup of the electrodeposition solution. Good uniformity and adhesion of the gold to the electrical conductors is most easily achieved when depositing gold on nickel or cobalt electrical conductors. When the electrodes consist of electrical conductors two microns wide by 250 microns long and spaced one micron apart, with a total number of 700 electrical conductors to a set, good quality gold electrodeposition is achieved by grounding the electrical conductors and passing six microamps of direct current through a gold anode placed about 1 mm above the electrical conductors, using a commercial gold cyanide electroplating solution such as the SG-10 gold solution sold by Transene Company, Inc. (Danvers, Mass.). On the other hand, when a solution of 4.7% sodium gold sulfite with 9% sodium sulfite, 2.4% sodium pyrophosphate, 3% disodiumphosphate, and 0.5% antimony potassium tartrate is used as the electroplating solution, good quality gold electrodeposition is obtained when 100 electrical conductors at a time are grounded and 5.7 microamps of direct current are passed through a gold anode for 2 seconds. The electrical current from a 12 volt power supply is passed through a 2 megaohm resistor before the gold anode. When the length of the electrical conductors is increased from approximately 250 to 300 microns, it is necessary to increase the voltage to 16 volts to achieve good quality gold deposition.

Another aspect of the present invention relates to a method of attaching nucleic acid molecules to electrically conductive surfaces by providing first and second electrical conductors comprised of nickel, the electrical conductors being located near, but not in contact with one another. The first electrical conductor is plated with gold. A first set of oligonucleotide probes is then attached to the first electrical conductor with an attachment chemistry which binds the first set of oligonucleotide probes to the first electrical conductor but not to the second electrical conductor. The first electrical conductor is then contacted with a thiol-containing blocking agent under conditions effective to bind to gold at all sites not occupied by the first set of oligonucleotide probes. The second electrical conductor is plated with gold. A second set of oligonucleotide probes is then attached to the gold on the second electrical conductor but not the first electrical conductor with an attachment chemistry which binds the second set of oligonucleotide probes to the gold of the second electrical conductor.

Nucleic acid molecules that are terminated with a six carbon chain ending in a thiol, or mercapto group, can be attached to electrically conductive gold surfaces. Generally, nucleic acids are shipped from the manufacturer in the oxidized, or disulfide form. Thus, before attachment to the gold surface, the nucleic acid molecules are reduced to the thiol form by treatment with an excess of a reducing agent such as sodium borohydride or TCEP (Tris[2-Carboxyethylphosphine]hydrochloride). The gold surface is then immersed in a solution of the reduced nucleic acid for a period of approximately 10 minutes, whereupon a self-assembled monolayer of the oligonucleotide probes covers the gold surface. Various attachment chemistries for attaching the oligonucleotide probes to the electrical conductors may be used. For example, a dative bond may be formed between the mercapto termination of the oligonucleotide probe and the surface of the electrical conductor. Alternatively, a siloxane bond may be used to attach the oligonucleotide probes to the electrical conductors.

Suitable blocking agents used to bind to gold at all sites not occupied by the oligonucleotide probes include all alkane thiols and all substituted alkane thiols. For example, hexanethiol, thiohexanol, and dodecanethiol, are all highly effective reagents for covering the surface of gold with a self-assembled monolayer. The effectiveness of this reagent derives from the extra bonding energy of VanderWaals interactions of the closely-packed hydrocarbon chains extending from the surface of the gold. Treatment of an electrical conductor with a blocking agent prevents nonspecific probe binding, as well as prevents any more oligonucleotide probes from binding the electrical conductor.

A further aspect of the present invention relates to a method of attaching nucleic acid molecules to electrically conductive surfaces by providing first and second electrical conductors comprised of gold. The electrical conductors are located near, but not in contact with one another. The first electrical conductor is plated with a cover layer of a metal other than gold. A first set of oligonucleotide probes is attached to the second electrical conductor with an attachment chemistry which binds the first set of oligonucleotide probes to the second electrical conductor but not to the first electrical conductor. The cover layer is then removed from the first electrical conductor. A second set of oligonucleotide probes is then attached to the first electrical conductor but not the second electrical conductor with an attachment chemistry which binds the first set of oligonucleotide probes to the first electrical conductor.

In yet a further aspect of the present invention related to a method of attaching nucleic acid molecules to electrically conductive surfaces, first and second electrical conductors located near, but not in contact with each other are provided. The second electrical conductor is comprised of gold and the first electrical conductor is comprised of an outer layer of metal other than gold. A first set of oligonucleotide probes is then attached to the second electrical conductor with an attachment chemistry which binds the first set of oligonucleotide probes to the second electrical conductor but not to the first electrical conductor. The first electrical conductor is plated with gold such that the gold covers the layer of metal. A second set of oligonucleotide probes is then attached to the first electrical conductor but not the second electrical conductor with an attachment chemistry which binds the second set of oligonucleotide probes to the first electrical conductor but not to the second electrical conductor.

Removing the cover layer from an electrical conductor may be achieved by etching off the cover layer either chemically or electrochemically. Chemically, a suitable method of removing the cover layer of metal is by washing the electrical conductor with -the cover layer in a mild acid solution. Thus, for example, a cover layer of nickel from a nickel chloride solution may be plated over the gold of a first electrical conductor to provide a blocking layer for the attachment of oligonucleotide probes. The cover layer of nickel may then be removed from the first electrical conductor with a mild acid solution without harming a second electrical conductor.

Other metals can be electroplated over gold on the electrical conductors to create a cover layer. For example, tin, indium, zinc, cobalt, titanium, chromium, copper, zirconium, and iridium may all be suitable metals for a cover layer.

The thickness of the metal cover layer can range from about 10 nm to about 1000 nm, more preferably from about 30 nm to 100 nm. However, the cover layer only needs to be thick enough to provide a continuous blocking layer. The thinner the layer, the easier it may be removed by etching.

In addition to metal cover layers, other blocking materials may be used to cover a gold-surfaced electrical conductor to block the attachment of oligonucleotide probes. For example, an acrylic monomer such as 2-vinylpyridine can be polymerized on the surface of the gold by electrochemical initiation of the polymerization reaction. To uncover and unblock the gold surface, the electrical conductor can be washed with a mild acid such as acetic acid which will dissolve the polyvinylpyridine. Other monomers, such as vinyl imidiazole, may also be used as blocking cover layers.

Various other methods exist for attaching the oligonucleotide probes to the electrical conductors. For example, U.S. Pat. Nos. 5,861,242, 5,861,242, 5,856,174, 5,856,101, and 5,837,832, which are hereby incorporated by reference in their entirety, disclose a method where light is shone through a mask to activate functional (for oligonucleotides, typically an —OH) groups protected with a photo-removable protecting group on a surface of a solid support. After light activation, a nucleoside building block, itself protected with a photo-removable protecting group (at the 5'-OH), is coupled to the activated areas of the support. The process can be repeated, using different masks or mask orientations and building blocks, to place probes on a substrate.

Alternatively, new methods for the combinatorial chemical synthesis of peptide, polycarbamate, and oligonucleotide arrays have recently been reported (see Fodor et al., *Science* 251:767-773 (1991); Cho et al., *Science* 261:1303-1305 (1993); and Southern et al., *Genomics* 13:1008-10017 (1992), which are hereby incorporated by reference in their entirety). These arrays (see Fodor et al., *Nature* 364:555-556 (1993), which is hereby incorporated by reference in its entirety) harbor specific chemical compounds at precise locations in a high-density, information rich format, and are a powerful tool for the study of biological recognition processes.

Preferably, the probes are attached to the leads through spatially directed oligonucleotide synthesis. Spatially directed oligonucleotide synthesis may be carried out by any method of directing the synthesis of an oligonucleotide to a specific location on a substrate. Methods for spatially directed oligonucleotide synthesis include, without limitation, light-directed oligonucleotide synthesis, microlithography, application by ink jet, microchannel deposition to specific locations and sequestration with physical barriers. In general, these methods involve generating active sites, usually by removing protective groups, and coupling to the active site a nucleotide which, itself, optionally has a protected active site if further nucleotide coupling is desired.

In one embodiment, the lead-bound oligonucleotides are synthesized at specific locations by light-directed oligonucleotide synthesis which is disclosed in U.S. Pat. No. 5,143,854, WO 92/10092, and WO 90/15070, which are hereby incorporated by reference in their entirety. In a basic strategy of this process, the surface of a solid support modified with linkers and photolabile protecting groups is illuminated through a photolithographic mask, yielding reactive hydroxyl groups in the illuminated regions. A 3'-O-phosphoramidite-activated deoxynucleoside (protected at the 5'-hydroxyl with a photolabile group) is then presented to the surface and coupling occurs at sites that were exposed to light. Following the optional capping of unreacted active sites and oxidation, the substrate is rinsed and the surface is illuminated through a second mask, to expose additional hydroxyl groups for coupling to the linker. A second 5'-protected, 3'-O-phosphoramidite-activated deoxynucleoside (C—X) is presented to the surface. The selective photodeprotection and coupling cycles are repeated until the desired set of probes are obtained. Photolabile groups are then optionally removed, and the sequence is, thereafter, optionally capped. Side chain protective groups, if present, are also removed. Since photolithography is used, the process can be miniaturized to specifically target leads in high densities on the support.

The protective groups can, themselves, be photolabile. Alternatively, the protective groups can be labile under certain chemical conditions, e.g., acid. In this example, the surface of the solid support can contain a composition that generates acids upon exposure to light. Thus, exposure of a region of the substrate to light generates acids in that region that remove the protective groups in the exposed region. Also, the synthesis method can use 3'-protected 5'-O-phosphoramidite-activated deoxynucleoside. In this case, the oligonucleotide is synthesized in the 5' to 3' direction, which results in a free 5' end.

The general process of removing protective groups by exposure to light, coupling nucleotides (optionally competent for further coupling) to the exposed active sites, and optionally capping unreacted sites is referred to herein as "light-directed nucleotide coupling."

The probes may be targeted to the electrically separated conductors by using a chemical reaction for attaching the probe or nucleotide to the conductor which preferably binds the probe or nucleotide to the conductor rather than the support material. Alternatively, the probe or nucleotide may be targeted to the conductor by building up a charge on the conductor which electrostatically attracts the probe or nucleotide.

Nucleases can be used to remove probes which are attached to the wrong conductor. More particularly, a target nucleic acid molecule may be added to the probes. Targets which bind at both ends to probes, one end to each conductor, will have no free ends and will be resistant to exonuclease digestion. However, probes which are positioned so that the target cannot contact both conductors will be bound at only one end, leaving the molecule subject to digestion. Thus, improperly located probes can be removed while protecting the properly located probes. After the protease is removed or inactivated, the target nucleic acid molecule can be removed and the device is ready for use.

The oligonucleotide probes can be formed from natural nucleotides, chemically modified nucleotides, or nucleotide analogs, as long as they have activated hydroxyl groups compatible with the linking chemistry. Such RNA or DNA analogs comprise but are not limited to 2'-O-alkyl sugar modifications, methylphosphonate, phosphorothioate, phosphorodithioate, formacetal, 3'-thioformacetal, sulfone, sulfamate, and nitroxide backbone modifications, amides, and analogs, where the base moieties have been modified. In addition, analogs of oligomers may be polymers in which the sugar moiety has been modified or replaced by another suitable moiety, resulting in polymers which include, but are not limited to, polyvinyl backbones (Pitha et al., "Preparation and Properties of Poly (1-vinylcytosine)," *Biochim. Biophys. Acta* 204:381-8 (1970); Pitha et al., "Poly(1-vinyluracil): The Preparation and Interactions with Adenosine Derivatives," *Biochim. Biophys. Acta* 204:39-48 (1970), which are hereby incorporated by reference in their entirety), morpholino backbones (Summerton, et al., "Morpholino Antisense Oligomers: Design, Preparation, and Properties," *Antisense Nucleic Acid Drug Dev.* 7:187-9 (1997), which is hereby incorporated by reference in its entirety) and peptide nucleic acid (PNA) analogs (Stein et al., "A Specificity Comparison of Four Antisense Types: Morpholino, 2'-O-methyl RNA, DNA, and Phosphorothioate DNA," *J. Antisense Nucleic Acid Drug Dev.* 7:151-7 (1997); Faruqi et al., "Peptide Nucleic Acid-Targeted Mutagenesis of a Chromosomal Gene in Mouse Cells," *Proc. Natl. Acad. Sci. USA* 95:1398-403 (1998); Christensen et al., "Solid-Phase Synthesis of Peptide Nucleic Acids," *J. Pept. Sci.* 1:175-83 (1995); Nielsen et al., "Peptide Nucleic Acid (PNA). A DNA Mimic with a Peptide Backbone," *Bioconjug. Chem.* 5:3-7 (1994), which are hereby incorporated by reference in their entirety).

The oligonucleotide probes can contain the following exemplary modifications: pendant moieties, such as, proteins (including, for example, nucleases, toxins, antibodies, signal peptides and poly-L-lysine); intercalators (e.g., acridine and psoralen), chelators (e.g., metals, radioactive metals, boron and oxidative metals), alkylators, and other modified linkages (e.g., alpha anomeric nucleic acids). Such analogs include various combinations of the above-mentioned modifications involving linkage groups and/or structural modifications of the sugar or base for the purpose of improving RNAseH-mediated destruction of the targeted RNA, binding affinity, nuclease resistance, and or target specificity.

The present invention can be used for numerous applications, such as detection of pathogens. For example, samples may be isolated from drinking water or food and rapidly screened for infectious organisms. The present invention may also be used for food and water testing. In recent times, there have been several large recalls of tainted meat products. The detection system of the present invention can be used for the in-process detection of pathogens in foods and the subsequent disposal of the contaminated materials. This could significantly improve food safety, prevent food borne illnesses and death, and avoid costly recalls. Capture probes that can identify common food borne pathogens, such as *Salmonella* and *E. coli*., could be designed for use within the food industry.

In yet another embodiment, the present invention can be used for real time detection of biological warfare agents. With the recent concerns of the use of biological weapons in a theater of war and in terrorist attacks, the device could be configured into a personal sensor for the combat soldier or into a remote sensor for advanced warnings of a biological threat. The devices which can be used to specifically identify the agent, can be coupled with a modem to send the information to another location. Mobile devices may also include a global positioning system to provide both location and pathogen information.

In yet another embodiment, the present invention may be used to identify an individual. A series of probes, of sufficient number to distinguish individuals with a high degree of reliability, are placed within the device. Various polymorphism sites are used. Preferentially, the device can determine the identity to a specificity of greater than one in one million, more preferred is a specificity of greater than one in one billion, even more preferred is a specificity of greater than one in ten billion.

EXAMPLES

The following examples are provided to illustrate embodiments of the present invention but are by no means intended to limit its scope.

Example 1

Preparation of Chips

Silicon wafers were oxidized to provide a 500 nm silicon oxide electrically insulating top layer. The wafer was then coated with positive photoresist, imaged with a mask having openings where metal is desired, and developed to give open areas where metal is desired. The wafer was then placed in the vacuum evaporator, and about 50 nm of chromium followed by about 50 nm of gold was evaporated onto the wafer. The wafer was then developed in photoresist developer to lift off the unwanted metal areas, leaving a pattern of interdigitated 1 micron wires with 1 micron spaces between them, along with lead wires connecting the interdigitated wires to electrical interrogation pads. The wafer was then diced on a diamond saw into individual chips, each chip having 14 features, each feature consisting of 100 left connected wires 1 micron thick and 200 microns long interdigitated with 100 right connected wires, also 1 micron thick and 200 microns long, with 1 micron spaces between the wires. Electrical measurements were taken at this point to be sure there was no electrical conductivity between the right and left hand wires.

The chips were then cleaned in a solution that is 1 part concentrated ammonium hydroxide to 10 parts 30% hydrogen peroxide. The chips were then washed with several changes of E-pure water. The chips were then dried under a stream of dry nitrogen.

Example 2

Attachment of the Oligonucleotide Probes to the Gold Wires

A reducing solution containing Free TCEP was made as follows:

|  | Amount in µl | Final concentration |
| --- | --- | --- |
| 3 M Sodium Acetate (pH 5.5) | 84.0 µl | 0.5 M |
| 8 M Guanidine Hydrochloride | 250.0 µl | 4.0 M |
| 1 M Free TCEP (dissolved in 10 mM Tris) | 12.5 µl | 0.3 M |
| dH$_2$O | 154.0 µl | |
|  | 500.0 µl | |

1 µl of a 100 µM stock of DNA probe to be reduced was added to 500 µl of the reducing solution (DNA probes at 0.2 µM final concentration). Equal volumes of the two DNA probes that were to be deposited on the microchips were mixed. Clean microchips were placed in a Petri dish. 15 µl of the probe mixture was deposited on the features of individual microchips, and incubated at 37° C. for 1 hour. The microchips were rinsed with dH$_2$O before proceeding to the hot wash step. Hot wash buffer (4% SDS, 0.4 M Sodium Phosphate {pH 7.5}) was poured gently into the Petri dish containing the microchips. The dish was then incubated at 50° C. for 10 minutes. The microchips were then rinsed with dH$_2$O and blocked with 6-mercapto, 1-hexanol (Example 4).

Example 3

Blocking the DNA Bound Chips

The blocking solution (1 mM 6-mercapto, 1-hexanol in E pure water) was poured over the chips and incubated for 3 hours at room temperature. The blocking solution was poured off and the chips rinsed with several changes of E pure water and dried under a stream of dry nitrogen gas.

Example 4

Hybridization of Target DNA from a Sample

Template DNA was diluted in citrate buffer containing 60 mM sodium citrate (pH 7.5), 0.7% SDS, such that there was 1 ug DNA (amount was calculated for a 5.8 kb target, and equals 0.265 pmoles of DNA) in 20 ml buffer for each sample of DNA to be hybridized. The mixture was then incubated for 10 minutes at 95° C. to denature the DNA template. Up to 10 microchips chips were placed in a row in a sterile 50 ml conical tube. The microchips were placed face down with the broad side of microchips parallel to mouth of the bottle. 2 ml denatured template DNA was gently poured into the conical tube containing the microchips. (Alternatively, a Petri dish (with microchips placed face up) and 10 ml denatured template DNA can be used if the number of microchips to be hybridized is larger.) The tube/dish was immediately placed on the rocker platform in the 55° C. incubator. Conical tubes were positioned such that the liquid inside flowed from top to bottom of the tube when the platform was rocking. They were then incubated for 20 minutes at 55° C. with gentle rocking (between the 15-20 marks on rocker). Finally they were rinsed once with citrate buffer at 55° C., twice with 10 mM sodium citrate, dipped in dH$_2$O, and dried under N$_2$ stream.

Example 5

Metallization of Nucleic Acid with Nickel

A stock solution of 58 mM palladium chloride catalyst, pH 5.5, was prepared and diluted 3:1 with e-pure water to a final concentration of 19.3 mM, pH 4.0. The 19.3 mM solution was applied to the chips prepared as described above for 15 min. at room temperature, about 25 degrees C., rinsed with either a salt solution and e-pure water or just e-pure water and dried under a stream of N2. A development solution was made containing 0.076 g cupric chloride, 3.75 g nickel chloride, 6.7 g 50% gluconic acid solution and pH adjust the total solution to 9.0. This development solution is combined with a reducing agent, such as dimethylaminoborane and applied to the chip for 6-7 minutes at room temperature about 25 degrees C., rinsed with either a salt solution and then e-pure water or just e-pure water, and dried with N2.

Example 6

Scatter-Light Detection

Figure 4:
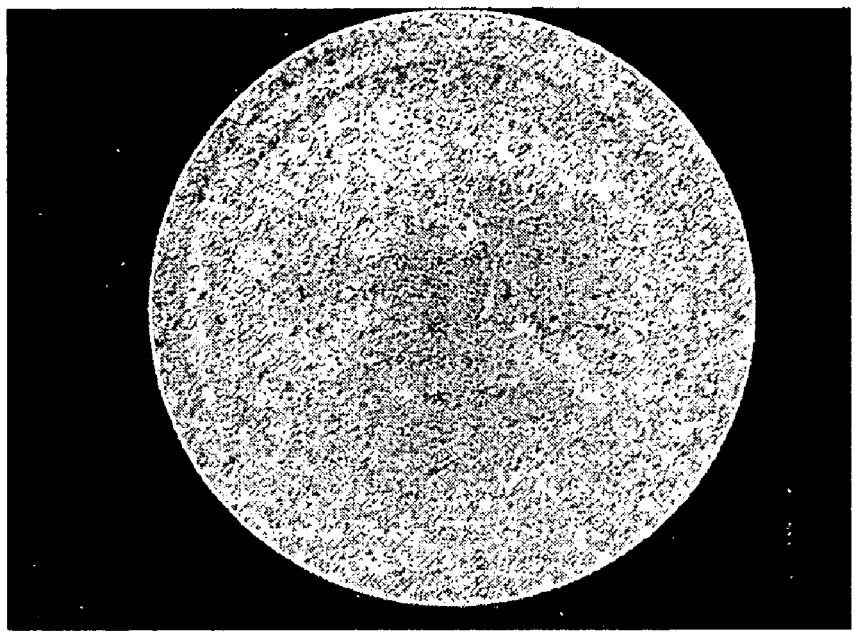
FIG. 4 shows a digital photograph of gold enhanced DNA on a glass slide.

A microscope slide coated with 3-aminopropyltrimethoxysliane (Coming Ultra-Gap slide, Corning Corporation, Corning, N.Y.) was spotted with ½ microliter portions of a solution of 20 picograms of silver salt of DNA. (Prepared by mixing a solution of Calf Thymus DNA (D 1501 from Sigma-Aldrich, Inc., St. Louis, Mo.) at 5 micrograms per ml with 1 microliter of 6% silver nitrate in water, then precipitating the DNA with ethanol, spinning down the pellet, decanting the solution, washing the pellet with 70% ethanol, then pure ethanol, drying the pellet and then redissolving the DNA pellet in water.) After drying the spot, the glass slide was rinsed with water and air dried. 200 microliters of a 0.25% solution of potassium tetrachloroaurate in water was then placed in an ependorf tube. Then 140 microliters of a 0.65% solution of potassium thiocyanate was added to the tube. A bright orange color was generated. When the color had faded to colorless (about 10 seconds), 120 microliters of a 0.83% solution of p-(methylamino)phenol sulfate also containing 0.5% sodium sulfite was added to the tube and mixed. The mixed solution was flooded onto the glass slide and allowed to sit for 4 minutes at 35° C. The slide was then rinsed with water, air dried, and observed by dark field optical microscopy. The results of the digital electronic image generated by a digital ccd camera are shown in FIG. 4. The background of the glass slide, being smooth and flat, shows as black under dark field microscopy. The gold enhanced DNA scatters light and shows as a white circle.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A method for metallizing one or more sites of a nucleic acid molecule comprising:
   hybridizing the nucleic acid molecule to one or more sets of two oligonucleotide probes, the two oligonucleotide probes positioned such that they cannot come into contact with one another;
   providing palladium ions;
   contacting the palladium ions and the nucleic acid molecule under conditions effective to bind the palladium ions on one or more sites of the nucleic acid molecule;

wherein the palladium ions strongly associate with the nucleic acid molecule to prevent general and spontaneous deposition of the palladium ions; and contacting the nucleic acid molecule having palladium ions bound to one or more of its sites with nickel or nickel alloy under conditions effective to deposit nickel or nickel alloy on the nucleic acid molecule.

2. The method according to claim 1, wherein the nucleic acid molecule is selected from the group consisting of DNA, RNA, chemically modified nucleic acid molecules, and nucleic acid analogs.

3. The method according to claim 1, wherein the palladium ions are in a solution comprising palladium acetate, acetone, and water.

4. The method according to claim 1, wherein the palladium ions are in an aqueous solution of palladium chloride.

5. The method according to claim 1, wherein contacting the palladium ions and a nucleic acid molecule is carried out for about 1 second to about 1 hour.

6. The method according to claim 1, wherein the nickel or nickel alloy is an electroless nickel plating solution.

7. The method according to claim 1, wherein contacting the nucleic acid molecule having palladium ions bound to one or more of its sites with nickel or nickel alloy is carried out for about 1 second to about 1 hour.

8. The method according to claim 1 further comprising:
washing away excess palladium ions from the nucleic acid molecule prior to contacting the nucleic acid molecule having palladium ions bound to one or more of its sites with nickel or nickel alloy.

9. A method for detecting a target nucleic acid molecule in a sample comprising:
providing a device for detecting the presence of the target nucleic acid molecule in a sample comprising:
two electrical conductors, including a first electrical conductor and a second electrical conductor, wherein the electrical conductors are not in contact with one another and
one or more sets of two oligonucleotide probes attached to the electrical conductors, wherein the probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes;
contacting the probes with a sample which may have the target nucleic acid molecule under selective hybridization conditions to permit target nucleic acid molecules, if any, present in the sample to hybridize to both of the probes and form a complex of the target nucleic acid molecule hybridized to the probes;
providing palladium ions;
contacting the palladium ions with the device after said contacting the probes with the sample under conditions effective to bind the palladium ions on one or more sites of any of the complex of the target nucleic acid molecules hybridized to the probes; wherein the palladium ions more strongly associate with the target nucleic acid molecule than with the electrical conductors, preventing general and spontaneous deposition of the palladium ions;
contacting the device with nickel or nickel alloy under conditions effective to deposit nickel or nickel alloy on the complex; and determining if an electrical current can be carried between the probes, said electrical current between the probes indicating the presence of the target nucleic acid molecule in the sample.

10. The method according to claim 9, wherein the target nucleic acid molecule is selected from the group consisting of DNA, RNA, chemically modified nucleic acid molecules, and nucleic acid analogs.

11. The method according to claim 9, wherein the palladium ions are in a solution comprising palladium acetate, acetone, and water.

12. The method according to claim 9, wherein the palladium ions are in an aqueous solution of palladium chloride.

13. The method according to claim 9, wherein the sample is saliva, whole blood, peripheral blood lymphocytes, skin, hair, or semen.

14. The method according to claim 9, wherein said method is used to detect infectious agents.

15. The method according to claim 9, wherein said method is used for nucleic acid sequencing.

16. The method according to claim 9, wherein contacting the palladium ions and the device is carried out for about 1 second to about 1 hour.

17. The method according to claim 9, wherein the nickel or nickel alloy is in an electroless nickel plating solution.

18. The method according to claim 9, wherein contacting the device with nickel is carried out for about 1 second to about 1 hour.

19. The method according to claim 9 further comprising:
washing away excess palladium ions from the complex prior to contacting the device with nickel or nickel alloy.

20. The method according to claim 9, wherein the probes are complementary to sequences from genetic material of a pathogenic bacteria.

21. The method according to claim 20, wherein the pathogenic bacteria is a biowarfare agent.

22. The method according to claim 20, wherein the pathogenic bacteria is a food borne pathogen.

23. The method according to claim 9, wherein the probes are complementary to sequences from genetic material of a virus.

24. The method according to claim 9, wherein the probes are complementary to sequences from genetic material of a human.

25. The method according to claim 9, wherein one or both of the probes has a sequence which is complementary to a sequence having a polymorphism, wherein at least one base complementary to the polymorphism is located at an end of the probe distal to the conductors.

26. A method for metallizing one or more sites of a nucleic acid molecule comprising:
hybridizing the nucleic acid molecule to one or more sets of two oligonucleotide probes, the two oligonucleotide probes positioned such that they cannot come into contact with one another;
providing stannous ions;
contacting the stannous ions and the nucleic acid molecule under conditions effective to bind stannous ions on one or more sites of the nucleic acid molecule; wherein the stannous ions strongly associate with the nucleic acid molecule preventing general and spontaneous deposition of the stannous ions; and
contacting the nucleic acid molecule having stannous ions bound to one or more of its sites with silver under conditions effective to deposit silver on the nucleic acid molecule.

27. A method for detecting a target nucleic acid molecule in a sample comprising:
- providing a device for detecting the presence of the target nucleic acid molecule in a sample comprising:
  - two electrical conductors, including a first electrical conductor and a second electrical conductor, wherein the electrical conductors are not in contact with one another and
  - one or more sets of two oligonucleotide probes attached to the electrical conductors, wherein the probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes;
- contacting the probes with a sample which may have the target nucleic acid molecule under selective hybridization conditions to permit target nucleic acid molecules, if any, present in the sample to hybridize to both of the probes and form a complex of the target nucleic acid molecule hybridized to the probes;
- providing stannous ions;
- contacting the palladium ions with the device after said contacting the probes with the sample under conditions effective to bind the stannous ions on one or more sites of any of the complex of the target nucleic acid molecules hybridized to the probes; wherein the stannous ions more strongly associate with the target nucleic acid molecule than with the electrical conductors, preventing general and spontaneous deposition of the stannous ions;
- contacting the device with silver under conditions effective to deposit silver on the complex of the nucleic acid molecules hybridized to the probes; and
- determining if an electrical current can be carried between the probes, said electrical current between the probes indicating the presence of the target nucleic acid molecule in the sample.

28. A method for detecting a target nucleic acid molecule in a sample comprising:
- providing a device for detecting the presence of the target nucleic acid molecule in a sample comprising:
  - two electrical conductors, including a first electrical conductor and a second electrical conductor, wherein the electrical conductors are not in contact with one another and
  - one or more sets of two oligonucleotide probes attached to the electrical conductors, wherein the probes are positioned such that they cannot come into contact with one another and such that a target nucleic acid molecule, which has two sequences, a first sequence complementary to a first probe attached to the first electrical conductor and a second sequence complementary to a second probe attached to the second electrical conductor, can bind to both probes;
- contacting the probes with a sample which may have the target nucleic acid molecule under selective hybridization conditions to permit target nucleic acid molecules, if any, present in the sample to hybridize to both of the probes and form a complex of the target nucleic acid molecule hybridized to the probes;
- attaching to the probes and any target nucleic acid molecule metal ions; wherein the metal ions more strongly associate with the target nucleic acid molecule than with the electrical conductors, preventing general and spontaneous deposition of the metal ions; and
- determining the presence of the target nucleic acid molecule in the sample by detecting the scatter of light caused by the metal ions attached to the probes and any target nucleic acid molecule.

29. The method according to claim 1, further comprising two fixed electrical conductors, including a first electrical conductor and a second electrical conductor, wherein said one or more sets of two oligonucleotide probes are attached to said electrical conductors.

30. The method according to claim 29, wherein said two fixed electrical conductors are two spaced apart conductive fingers.

31. The method according to claim 26, further comprising two fixed electrical conductors, including a first electrical conductor and a second electrical conductor, wherein said one or mote sets of two oligonucleotide probes are attached to said electrical conductors.

* * * * *

UNITED STATES PATENT AND TRADEMARK OFFICE
CERTIFICATE OF CORRECTION

PATENT NO. : 7,645,574 B2
APPLICATION NO. : 10/763597
DATED : January 12, 2010
INVENTOR(S) : DeBoer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this

Twenty-eighth Day of December, 2010

David J. Kappos
*Director of the United States Patent and Trademark Office*